April 8, 1930. C. A. BROWN ET AL 1,754,143
MACHINE FOR CUTTING GLASS CANE OR TUBES
Filed Oct. 5, 1928 3 Sheets-Sheet 1
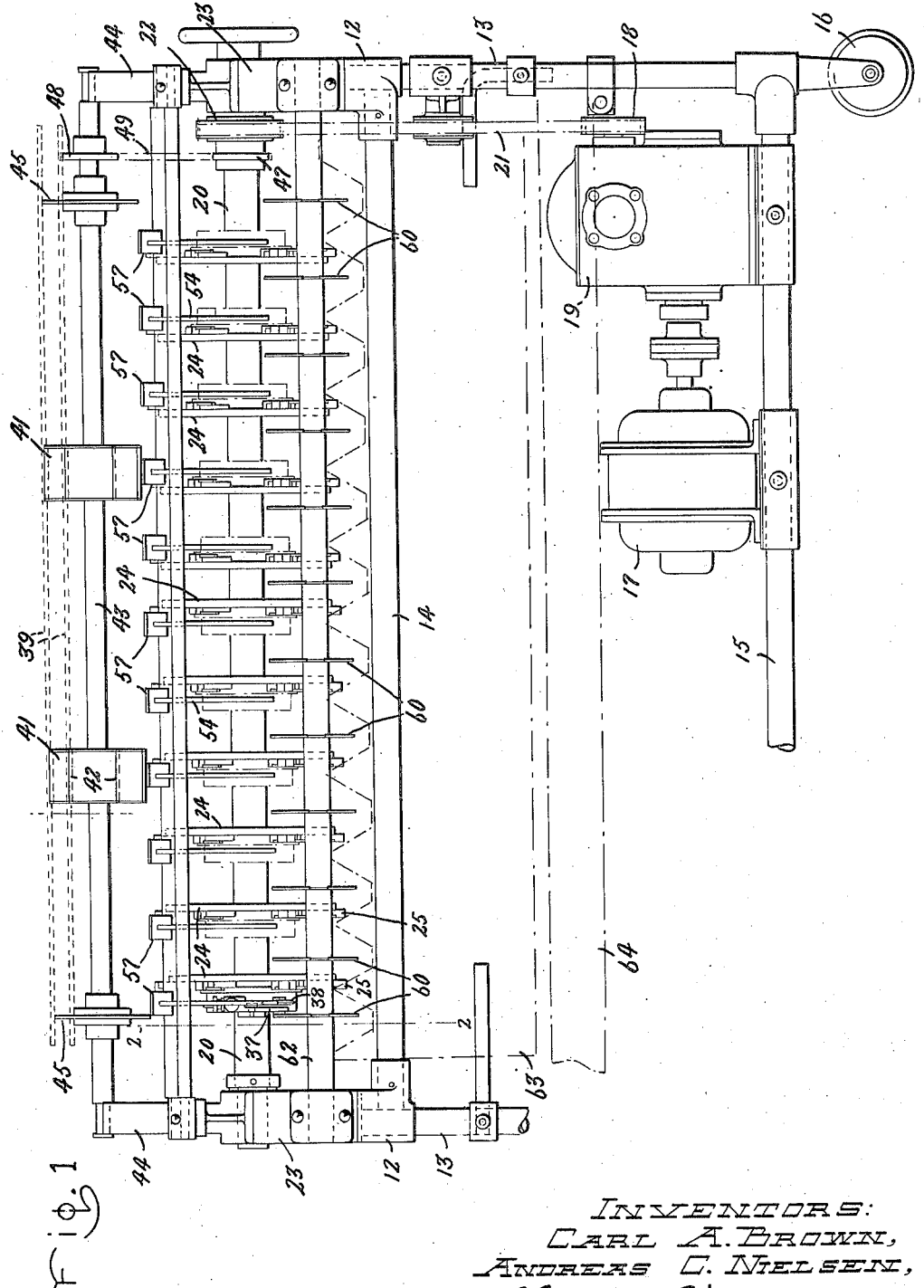
INVENTORS:
CARL A. BROWN,
ANDREAS C. NIELSEN,
BY Charles E. Tullar
THEIR ATTORNEY.

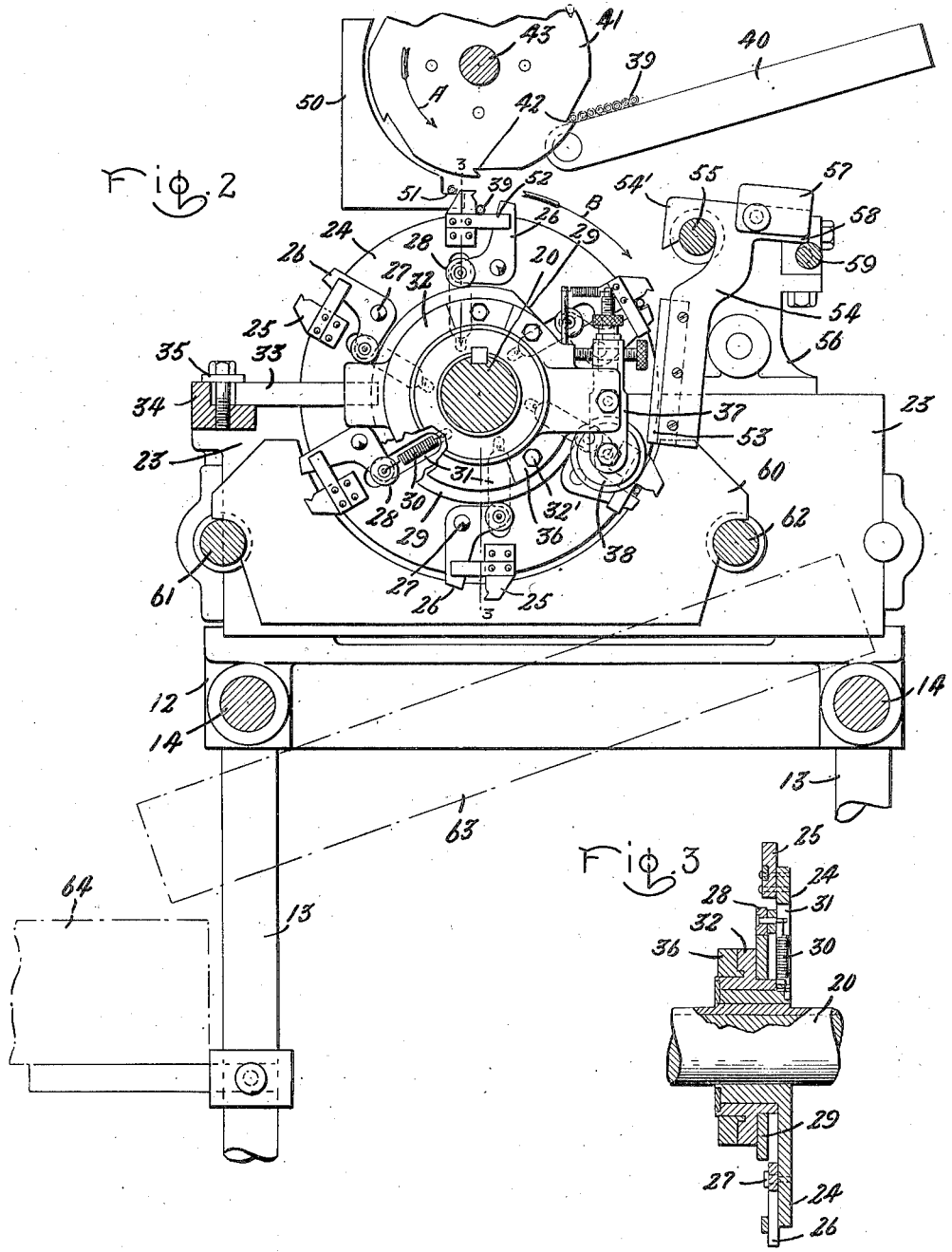

April 8, 1930.  C. A. BROWN ET AL  1,754,143
MACHINE FOR CUTTING GLASS CANE OR TUBES
Filed Oct. 5, 1928  3 Sheets-Sheet 3
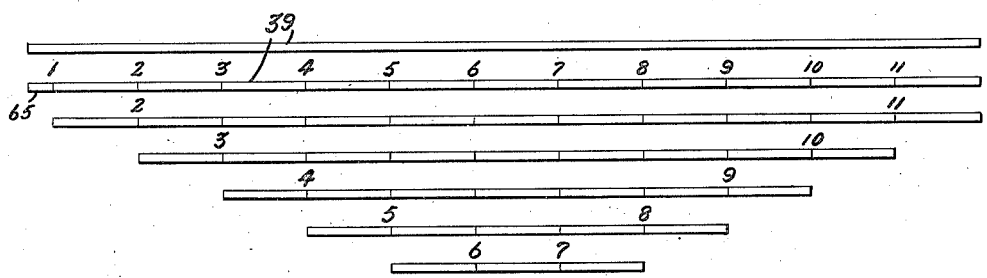
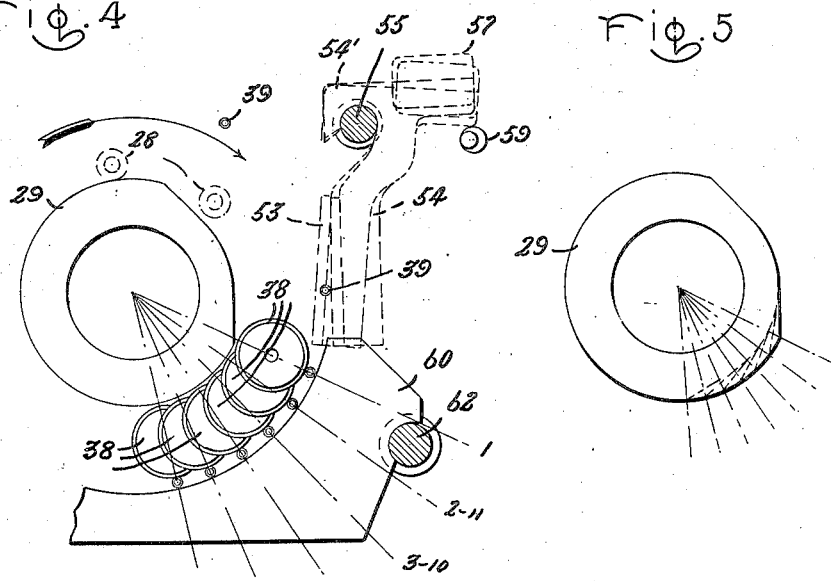
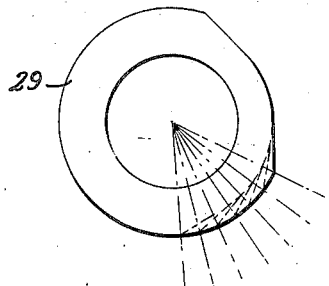
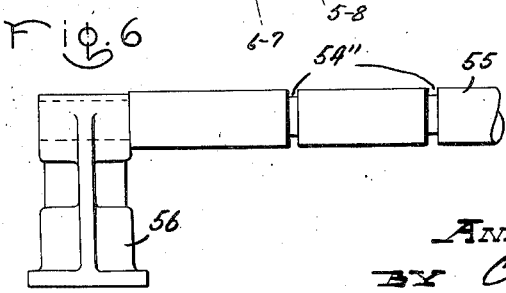
INVENTORS:
CARL A. BROWN,
ANDREAS C. NIELSEN,
BY Charles V. Tullar
THEIR ATTORNEY.

Patented Apr. 8, 1930

1,754,143

UNITED STATES PATENT OFFICE

CARL A. BROWN AND ANDREAS C. NIELSEN, OF EAST CLEVELAND, OHIO, ASSIGNORS TO GENERAL ELECTRIC COMPANY, A CORPORATION OF NEW YORK

MACHINE FOR CUTTING GLASS CANE OR TUBES

Application filed October 5, 1928. Serial No. 310,548.

Our invention relates to apparatus for subdividing lengths of glass cane or tubing and is particularly adapted to the cutting up of small diameter cane or tubing. According to our invention, the length of cane or tubing is carried by suitable chucks into contact with scoring knives and then into contact with breaking means, the chucks being opened to release the short lengths as they are formed. Although not essential, the preferred form of our invention comprises the step by step breaking up of the length of cane or tubing. Various other features and advantages of our invention will appear from the following description of a species thereof, and from the accompanying drawings.

In the drawings Fig. 1 is a fragmentary elevation of a machine made in accordance with our invention; Fig. 2 is a section along the line 2—2 of Fig. 1 on a somewhat larger scale; Fig. 3 is a section along the line 3—3 of Fig. 2; Fig. 4 is a detail showing the position of the scoring knives and breaker rollers; Fig. 5 is a detail showing the positions of the chuck opening cam; Fig. 6 is a fragmentary elevation of the knife holder shaft; and Fig. 7 is a diagrammatic view showing one way in which a length of cane or tubing may be severed into smaller lengths as it passes through our machine.

As shown in Figs. 1 and 2, the machine comprises a main frame or support having a pair of end brackets 12 supported through legs 13 which in turn are supported through upper and lower cross bars 14 and 15 respectively. The lower ends of the legs 13 have mounted thereon the rollers 16.

Suitable actuating mechanism such as an electric motor 17 operates the driving gear 18 through the usual reducing gears carried in the housing 19. This in turn operates the main drive shaft 20 through driving chain 21 and gear 22 keyed to the said shaft which is supported in bearings formed in a pair of end castings 23 carried by the brackets 12.

A plurality of units are adjustably mounted on the shaft 20 which is preferably substantially horizontally disposed. The number of units required is determined by the number of pieces into which the length of cane or glass tubing is to be divided. The specific machine shown in the drawing comprises eleven of these units. Each unit is divided into two parts, namely a rotating part and a stationary part. The rotating part comprises a circular plate 24 which is keyed to and rotates with the shaft 20 and has mounted thereon a number of chucks each of which comprises a stationary finger 25 and a movable finger 26.

As shown in Figs. 2 and 3, the movable fingers 26 are pivotally mounted at 27 on the plate 24 and each has attached to its inner end the cam roller 28. A stationary cam 29 upon which the roller 28 rides during a portion of its travel forces the fingers outwardly against the action of springs 30. These springs are located in slots 31 formed in the plate 24 and are attached to each of the fingers and the plate 24.

The stationary part of the unit to which the cam 29 is attached comprises a holder 32 which rests on a boss extending from the plate 24. Rotation of the holder 32 is prevented by means of an arm 33 which extends from the said holder to an anchor bar 34, to which it is attached by the clamp 35. The anchor bar 34 runs lengthwise of the machine and is supported at its ends by the castings 23. Adjustably mounted on the holder 32 by means of screws 32' is a bracket 36 having pivotally mounted thereon an arm 37 which carries a breaker roller 38, which, as explained hereinafter, is struck by a previously scored portion of the cane or tubing. The position of the roller 38 may be changed by changing the position of bracket 36.

In operation a supply of glass cane or tubes 39 is placed in a single layer upon a chute 40 and feeds by gravity toward a pair of feeder rolls 41 having a series of notches 42, each pair thereof being adapted to engage a length of cane or tube. The feeder rolls are mounted on a shaft 43 rotatably mounted in bearings formed in brackets 44 extending from the end castings 23. The shaft 43 also carries a pair of discs 45 upon which the ends of the cane or tubing rest so as to give them additional support while in transit. Rotation of the feeder shaft 43 is accomplished through the main drive shaft which has a sprocket 47 mounted thereon which drives the feeder shaft sprocket 48 through the chain 49.

Each length of cane or tube travels in the direction of the arrow A (Fig. 2) and eventually falls out of the feeder roll upon a guideway comprising a plurality of members 50 having rests 51 at the lower ends thereof. The circular plates 24 are rotated synchronously with the feed roller in the direction of the arrow B and their sets of stationary chuck fingers 25 are arranged each to engage a length of cane or tubing and to cause it to fall between the sets of fingers 25 and 26 and to rest upon a set of guide bars 52 extending from the stationary fingers 25. As the plate 24 continues to rotate the rollers 28 ride off the cams 29 thereby allowing the springs 30 to force the movable fingers 26 in toward the stationary fingers 25 to clamp and hold the length of cane or glass tubing. The cams 29 are shaped to close one aligned row or set of chucks simultaneously.

Located in the path of travel of the cane or tubing are a number of scoring knives 53 each rigidly supported in holders 54 having hooked ends 54' which rest in circumferential grooves 54'' in a shaft 55 carried in brackets 56 supported by the end castings 23. The holders and their knives are readily removed by lifting so that the hooked ends 54' clear the shaft thus allowing ready substitution if a knife becomes dull. The knives are positioned so that the depth and extent of scoring is sufficient for the size of cane or tubing which is being cut up and are swung so as to give somewhat to prevent breakage of glass. The knives are counterbalanced by weights 57 which are adjustably attached to the extensions 58 of the holders 54. The adjustment of the position of the knives is accomplished by means of the eccentric adjusting rod 59 upon which the extensions 58 rest. The cane or glass tube is scored at a number of points along its length simultaneously such as indicated by the numerals 1 to 11 in Fig. 7.

After the scoring of the length of cane or glass tubing, it is ready to be broken into short lengths and this is accomplished by a number of breaker rollers 38, which lie in the path of travel of the cane or tube directly opposite the scored points in staggered relation thereon. It is preferred to arrange the rollers 38 so that there will be a step breaking up of the length of cane or tubing rather than a simultaneous breaking up which is more apt to cause splintering. For step by step breaking, the breaker rollers are arranged at various points around the machine so as to be contacted with by the cane or tube at different points in its travel as shown in Fig. 4. As that portion of the cane or tube to be broken comes in contact with a breaker roller, the chuck adjacent the said roller is automatically opened upon its operating cam 29. The anvils 60 coperate with the breaker rollers during the breaking operation. There are a number of these anvils, as shown in Fig. 1, each being properly positioned and mounted on the bars 61 and 62 secured in the end castings 23 of the machine. The broken pieces of cane or tube fall upon an inclined chute 63 where they are directed to a container 64.

In Figs. 4 and 7 is shown diagrammatically how the step by step cutting up is accomplished. The length of glass is first scored simultaneously, as shown, at eleven different points indicated as 1 to 11 inclusive. The scored point indicated as 1 contacts with the foremost breaker roller 38 (Fig. 4) and with the help of the first anvil 60, the waste end 65 of the glass is disposed of. The scored points 2 and 11 next contact with the next pair of breaker rollers 38 located on opposite sides of the machine and accurately aligned with each other. Scored points 3 and 10 next pass their respective rollers followed by points 4 and 9, 5 and 8, and finally points 6 and 7 pass the last pair of rollers 38. The row of chucks across the machine which carried the length of cane or tube just severed remain open until they receive another length of cane or tube which awaits them on the rests 51.

What we claim as new and desire to secure by Letters Patent of the United States, is:

1. In an apparatus for subdividing lengths of glass cane or tubing, the combination of a series of aligned chucks for supporting a length of cane or tubing, a scoring means, a breaking means, and means for causing a movement of said chucks to bring said length successively into engagement with said scoring and breaking means.

2. In an apparatus for subdividing lengths of glass cane or tubing, the combination of a cane or tube delivery means, a scoring means, a breaking means, a series of aligned chucks, means for supporting said chucks in position to receive a length of cane or tubing from said delivery means, and means for rotating said supporting means to cause said length to successively engage said scoring and breaking means.

3. In an apparatus for subdividing lengths of glass cane or tubing, the combination of a series of rotatable carriers, a plurality of series of aligned chucks mounted on said carriers, a series of scoring knives mounted adjacent to the path of travel of said chucks, a series of breaking devices also mounted adjacent to said path, means for rotating said carriers to bring a length of cane or tubing into successive engagement with said scoring knives and breaking devices, and means for automatically opening and closing said chucks for the reception and discharge respectively of said length of cane or tubing.

4. In an apparatus for subdividing lengths of glass cane or tubing, the combination of a series of rotatable carriers, a plurality of series of aligned chucks mounted on said carriers, a series of scoring knives mounted adjacent to the path of travel of said chucks, a series of breaking devices also mounted adjacent to said path but having a staggered arrangement so as to cause step by step breaking, means for rotating said carriers to bring a length of cane or tubing into successive engagement with said scoring knives, and breaking devices, and means for automatically opening and closing said chucks for the reception and discharge respectively of said length of cane or tubing.

5. In an apparatus for subdividing lengths of glass cane or tubing, the combination of a substantially horizontally disposed series of movable aligned chucks for supporting a length of cane or tubing, a scoring means and a breaking means located adjacent to the path of travel of said chucks, and means for causing a movement of said chucks to bring said length successively into engagement with said scoring and breaking means.

6. In an apparatus for subdividing lengths of glass cane or tubing, the combination of a substantially horizontally disposed shaft having mounted thereon a series of carriers disposed transversely of said shaft, a plurality of chucks mounted on each of said carriers and arranged so that chucks of the several carriers are aligned, a series of scoring knives mounted adjacent to the path of travel of said chucks, means for rotating said shaft to bring lengths of cane or tubing into successive engagement with said scoring knives, and means for automatically opening and closing said chucks for the reception and discharge respectively of each of said lengths of cane or tubing.

In witness whereof, we have hereunto set our hands this 3rd day of October, 1928.

CARL A. BROWN.
ANDREAS C. NIELSEN.